United States Patent
Kroeger et al.

(10) Patent No.: US 8,239,490 B2
(45) Date of Patent: Aug. 7, 2012

(54) EXPOSING RESOURCE CAPABILITIES TO WEB APPLICATIONS

(75) Inventors: Robert John Kroeger, Waterloo (CA); Bryan Yeung, Waterloo (CA)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/250,342

(22) Filed: Sep. 30, 2011

(65) Prior Publication Data

US 2012/0042078 A1 Feb. 16, 2012

Related U.S. Application Data

(63) Continuation of application No. 12/854,047, filed on Aug. 10, 2010.

(51) Int. Cl.
*G06F 15/16* (2006.01)
(52) U.S. Cl. ...................................................... 709/218
(58) Field of Classification Search .................... 709/218
See application file for complete search history.

(56) References Cited

U.S. PATENT DOCUMENTS

| | | | | |
|---|---|---|---|---|
| 5,956,487 | A * | 9/1999 | Venkatraman et al. | 709/218 |
| 6,363,421 | B2 * | 3/2002 | Barker et al. | 709/223 |
| 7,587,196 | B2 * | 9/2009 | Hansen | 455/406 |
| 2003/0112274 | A1 * | 6/2003 | Gao et al. | 345/760 |
| 2005/0273846 | A1 * | 12/2005 | Hawkins et al. | 726/11 |
| 2009/0100178 | A1 | 4/2009 | Gonzales et al. | |
| 2010/0274922 | A1 * | 10/2010 | Reavely | 709/238 |

FOREIGN PATENT DOCUMENTS

WO 2008/003001 A2 1/2008

OTHER PUBLICATIONS

Can Filibeli et al., "Embedded web server-based home appliance networks", Journal of Network and Computer Application, Academic Press, New York, NY, US, vol. 30, No. 2, Jan. 13, 2007 (16 pgs.).
International Search Report and Written Opinion of corresponding application No. PCT/US2011/046136, mailed Oct. 6, 2011, 11 pgs.
U.S. Appl. No. 12/854,047, by Robert Kroeger, filed Aug. 10, 2010.

* cited by examiner

*Primary Examiner* — Ajay Bhatia
(74) *Attorney, Agent, or Firm* — Shumaker & Sieffert, P.A.

(57) ABSTRACT

The subject matter of this document can be implemented in, among other things, a method that includes executing a web application within a web browser of a computing device. The method also includes executing a resource server with an interface for receiving HTTP messages from the web application and an interface for communicating with a system resource of the computing device. The method further includes receiving, at the web application, an input to affect an operation of the system resource. The method also includes transmitting, from the web application to the resource server, an HTTP message to affect the operation of the system resource. The method further includes processing the HTTP message into a resource control message that includes information about the operation. The method also includes transmitting the resource control message from the resource server to the system resource to affect the operation by the system resource.

18 Claims, 5 Drawing Sheets

EXPOSING RESOURCE CAPABILITIES TO WEB APPLICATIONS

This application is a continuation of U.S. application Ser. No. 12/854,047, filed Aug. 10, 2010, the entire content of which is incorporated herein by reference.

TECHNICAL FIELD

This document relates to resource capabilities of a computing device.

BACKGROUND

Computer systems may include a number of native applications that perform a variety of tasks. Such native applications may include word processors, e-mail clients, media players, image or signal processing modules, file management tools, and the like. To operate efficiently, native applications are often written in a combination of general purpose programming languages such as C or C++ and low-level languages such as assembly language. Furthermore, native applications may have access to system resources such as graphics hardware, telephony hardware, camera hardware, sound cards, file systems, and network resources through various interfaces, such as application programming interfaces (APIs). Consequently, native applications may provide resource-specific features to users of computer systems on which the native applications are installed.

Web applications are software applications that are typically written in a scripting language that can be accessed via a web browser. Web applications can be embedded in HyperText Markup Language (HTML) web pages and have become a popular tool for web designers and developers to help create a rich experience for users. Some example web applications include e-mail, calendar, auctions, sales, and customer support among many others.

Although web applications have become more and more prevalent and interactive in recent years, security protocols generally restrict their ability to natively access low-level system resources, and as such, native applications are often used in cases where access to such system resources is utilized. Browsers may include extensions or special APIs that provide such access to system resources, but these extensions and APIs are not present in a standard browser. Furthermore, development of such extensions and APIs can often be time-consuming and may tie the web application to a particular platform.

SUMMARY

In general, this document describes techniques for exposing system resources, such as hardware device capabilities, to web applications executing in a standard, non-extended browser. For example, according to the techniques described herein, a web application may be used to monitor and/or control system-level hardware components, or other system resources, without utilizing browser extensions or special APIs built into the browser. As such, the web application is browser- and platform-independent, and can therefore be ported to various devices with relative ease.

The state and operational capabilities of a system resource (e.g., telephony hardware, camera hardware, file system, etc.) may be exposed to the web application by way of a resource server that operates similarly to a typical web server by using standard HyperText Transfer Protocol (HTTP) connection patterns. The resource server receives and processes HTTP messages from the web application, and uses the HTTP messages to monitor and/or control the appropriate system resource. Because the resource server resides outside the context of the browser, and therefore outside the reach of the security protocols that restrict direct access from the browser, the resource server can access native resource APIs that are used to access and control the system resources.

In one example, a computer-readable storage medium includes instructions that, when executed, cause one or more processors to execute a web application within a web browser of a computing device. The instructions also cause the one or more processors to execute a web server having a first interface for receiving HyperText Transfer Protocol (HTTP) messages from the web application and a second interface for communicating with a hardware component of the computing device. The instructions further cause the one or more processors to receive, at the web application, an input to affect an operation of the hardware component. The instructions also cause the one or more processors to transmit, from the web application to the web server, an HTTP message to affect the operation of the hardware component. The instructions further cause the one or more processors to process, at the web server, the HTTP message into a hardware control message that includes information about the operation. The instructions also cause the one or more processors to transmit the hardware control message from the web server to the hardware component to affect the operation by the hardware component.

In another example, a method includes executing a web application within a web browser of a computing device. The method also includes executing a resource server with an interface for receiving HTTP messages from the web application and an interface for communicating with a system resource of the computing device. The method further includes receiving, at the web application, an input to affect an operation of the system resource. The method also includes transmitting, from the web application to the resource server, an HTTP message to affect the operation of the system resource. The method further includes processing the HTTP message into a resource control message that includes information about the operation. The method also includes transmitting the resource control message from the resource server to the system resource to affect the operation by the system resource.

In another example, a system includes a web application executable in a browser of a computing device. The system also includes a resource server configured to control a system resource of the computing device. The resource server has a first interface for receiving HyperText Transfer Protocol (HTTP) messages from the web application and a second interface for communicating with the system resource. The system further includes means for controlling the system resource using the web application via the resource server.

The techniques described herein may provide one or more of the following advantages. In some implementations, the techniques provide a browser- and platform-independent architecture for a two-way command protocol between an application executing in a browser and a system resource of a device. The architecture is flexible and provides web developers a tool to access system resources using familiar HTTP connection patterns. In addition, security properties of the browser/server interfaces may be implemented to ensure that malicious operation of the system resources is appropriately restricted.

The details of one or more embodiments are set forth in the accompanying drawings and the description below. Other features, objects, and advantages will be apparent from the description and drawings, and from the claims.

BRIEF DESCRIPTION OF DRAWINGS

Like reference symbols in the various drawings indicate like elements.

DETAILED DESCRIPTION

In general, this disclosure describes techniques for exposing the resource capabilities of a device to applications executing in a standard, non-extended browser operating on the device. Browser-based web applications are typically unable to communicate with components that exist outside of the security protocols in which the browser-based applications run. As such, a two-way command protocol between an application executing in the browser and a system resource of the device is generally not available unless special extensions, application programming interfaces (APIs), or other such modifications are made to the browser.

According to the techniques described in this disclosure, such a two-way command protocol is provided to a web application executing in a standard, non-extended browser. As used herein, the term "non-extended" is not intended to mean that the browser is necessarily devoid of any extensions or APIs, but rather that the browser has not been specifically extended to directly control a system resource. Instead, the web application communicates with a resource server using common HTTP connection patterns (e.g., GET and POST messages), and the resource server in turn communicates with the system resource and exposes the capabilities of the system resource to the web application. As one example of these techniques, a telephone-related web application operating in a standard browser may be used to monitor and/or operate the telephony hardware capabilities of a mobile device by way of a telephony resource server.

Figure 1:
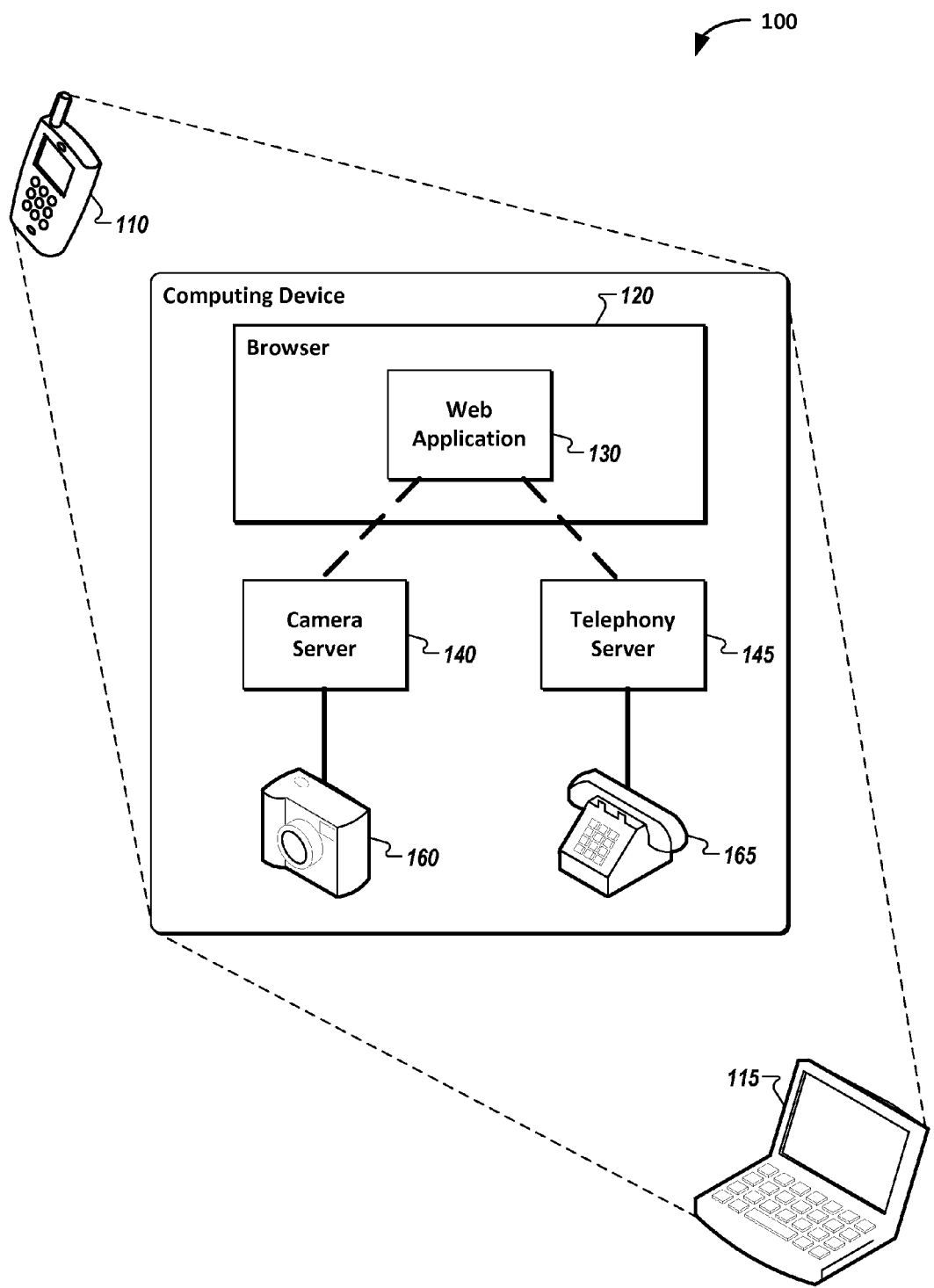
FIG. 1 is a conceptual diagram illustrating an example architecture for exposing resource capabilities of a computing device to a browser executing on the computing device.

FIG. 1 is a conceptual diagram illustrating an example architecture 100 for exposing resource capabilities of a computing device to a browser executing on the computing device. As shown, computing devices 110, 115 each include a browser 120 that is capable of executing a web application 130. Web application 130 is communicatively coupled to one or more resource servers, such as camera server 140 and/or telephony server 145. In turn, the resource servers are communicatively coupled to system resources of the computing device. For example, camera server 140 is communicatively coupled to camera hardware 160, and telephony server 145 is communicatively coupled to telephony hardware 165.

As shown, computing devices 110, 115 correspond to a mobile device and a laptop computer, respectively. However, computing devices 110, 115 can be any type of computing device that is capable of executing a browser 120. As such, example computing devices may include any type of computer (e.g., a desktop computer, a workstation, a tablet, a notebook, a netbook, a mainframe, a terminal, etc.), any type of handheld device (e.g., a smart phone, a personal digital assistant, etc.), or the like.

Browser 120 is a computer software application that operates on a computing device, e.g., computing device 110, and enables information to be accessed via one or more servers. In some instances, the servers, e.g., web servers (not shown), are hosted remotely from the computing device, and browser 120 provides access to the remote servers over a network, such as the Internet. In other instances, the servers may be local to the computing device, such as resource servers 140, 145, which operate on the computing device. In either case, browser 120 and the servers communicate using conventional HTTP connection patterns.

Browser 120 is configured to access information from the servers, whether local or remote, by utilizing uniform resource identifiers (URIs) that identify a resource by location, by name, or by both. Browser 120 is also configured to access information from the servers using a form of a URI known as a uniform resource locator (URL), which defines the location of a specific resource and how the resource can be accessed. Browser 120 may be configured to present network accessible and/or other information to a user in one or more browser windows, or browser tabs within the browser. Browser 120 may enable a user to open a plurality of web browser windows, or tabs within a web browser window, simultaneously.

In general, a web application is a computer software application that executes within a browser-based computing environment. For example, web application 130 is shown executing within the context of browser 120. Web applications may be coded in any number of different browser-supported languages (e.g., JavaScript). A single browser 120 may be used to concurrently run multiple web applications. For example, both an e-mail and a calendar web application can be displayed in different pages or tabs of browser 120, or may be displayed on the same page in the browser.

In the example architecture 100, web application 130 is shown communicatively coupled to two resource servers 140, 145. The coupling is shown as a dashed line to indicate that the communication channel between web application 130 and each of resource servers 140, 145 is not via a direct interface, such as an API or browser extension. Instead, resource servers 140, 145 operate as web servers operating outside the context of browser 120 to serve resources to web application 130 executing in browser 120. As described in this disclosure, this architecture allows web application 130 to operate within a standard, non-extended web browser 120 to access the capabilities of various system resources, such as camera hardware 160 or telephony hardware 165 for example.

Although web application 130 executes within browser 120, it may be hosted remotely from browser 120. For example, web application 130 may be hosted on one or more of resource servers 140, 145, and each resource server may host one or more web applications. For example, server 140 may host a camera web application, and server 145 may host a telephony web application. These and other web applications may be accessed by browser 120 using an HTTP connection with the appropriate server. For example, when a user of browser 120 navigates to an HTML page that contains a reference to a web application hosted on one of the resource servers, the browser may download the web application and begin executing the application within the browser. In some implementations, web application 130 may alternatively be hosted on a server, e.g., a web server, which is remote from the client device.

In some implementations, a web application that is configured to communicate with a particular resource server is hosted on that resource server. For example, if web application 130 is a camera web application, it may be hosted on camera resource server 140. In such implementations, domain origin policies may provide a layer of security by preventing potentially malicious web applications that are not hosted on the resource servers from accessing the resource server, which in turn prevents the potentially malicious web applications from accessing the system resources of the device. In other implementations, the resource server may act as a proxy by providing the location of the web application host, which also provides a level of security protection from malicious code as described above.

Other security measures may also be implemented to ensure that web applications and other code are not allowed malicious access to the various system resources of a device. For example, a user may be required to opt-in to allow the web application access to the capabilities of various system resources. For example, upon launching a web application that is attempting to access system resources via a resource server, a user of the device may be asked whether to allow such access before the action is allowed to proceed. In some implementations, a user may opt-in to access for each system resource individually. In other implementations, the opt-in feature may be used to cover access to multiple or all capabilities of a particular device. In addition, specific capabilities of a particular system resource may be opted-into either individually or collectively. For example, a user may opt-in to allow a web application access to the picture-taking capabilities of a camera, but the user may choose not to allow the camera to be turned on or off using the web application. These and other security measures may be implemented in the web applications, the resource servers, or a combination thereof.

Resource servers 140, 145 may operate similarly to traditional web servers in that they listen for, receive, and process standard HTTP commands. As described above, in some implementations, resource servers 140, 145 host web applications related to specific resources (e.g., camera hardware 160 or telephony hardware 165, respectively), or serve as a proxy to the web applications. As such, when a browser-readable page (e.g., an HTML page) points to the resource server and requests the web application, it is either served directly by the resource server or provided via a proxy. In this manner, browser 120 may be assured that the web application is not malicious, and may run the web application as a trusted process.

The URL scheme for accessing web applications hosted or proxied by the resource server may be specifically assigned to identify that the web application provides access to a system resource. As an example, a URL of dev://www.foo.com/telephone may be defined to access a telephony web application on resource server foo.com. The dev:// portion of the URL may indicate that the URL relates to a device resource, such that similarly labeled device resources may be easily searched (e.g., by searching for URLs having a "dev" protocol) using known searching tools and protocols.

In the example above, a namespace for the telephony resource may include two URLs—one for monitoring the state of the resource, and another for controlling the resource. For example, to monitor the state of a telephony resource, a web application (e.g., web application 130) may transmit an HTTP GET call, e.g., an XMLHttpRequest (XHR) GET call, to dev://www.foo.com/telephone/state, which may return a state response object after the state of the resource changes. In some implementations, the GET call may be held open as a long-running GET call, which remains open until either the GET expires (e.g., after 30 seconds, 1 minute, etc.) or until the state response object is returned from the resource server (e.g., telephony server 145) indicating an update in the status of the resource. For example, a telephone-related web application may continuously monitor the state of telephony hardware 145 by issuing consecutive long-running GETs to telephony server 145. Holding the GET request open for a period of time, rather than continuously polling the resource server, may provide extended battery life for the device, but continuous or intermittent polling may also be used as an alternative to long-running GETs in some implementations.

Similarly, to control a telephony resource, web application 130 may transmit an HTTP POST call, e.g., an XHR POST call, to dev://www.foo.com/telephone/cmd with a command that corresponds to an input from the web application. For example, if the user selects a "Call" button on web application 130, indicating a desire to "pick up" the telephone to place a telephone call, web application 130 may generate a message, e.g., a JavaScript Object Notation (JSON) object, that instructs resource server 145 to control telephony hardware 165 to execute the desired operation. The example URLs above are provided for illustration purposes only, and should not be considered as limiting. In general, aspects of this disclosure may be implemented using other appropriate platform-independent HTTP communication protocols.

As described above, resource servers 140, 145 operate as a bridge between web application 130 operating in browser 120 and one or more system resources, e.g., camera hardware 160 and telephony hardware 165. The resource servers operate outside the virtual memory space of browser 120, and are not constrained by the security protocols that govern browser 120 and the applications executing within browser 120. As such, resource servers 140, 145 may have access to native APIs that are used to control system resources, while a non-extended browser and the applications running in a non-extended browser are prevented from accessing such native APIs directly.

In some implementations, a single resource server may be used to provide access to multiple resources. For example, rather than using a separate camera server 140 and telephony server 145 to provide access to camera hardware 160 and telephony hardware 165, respectively, a single resource server may be utilized as a bridge between web application 130 and multiple system resources. In other implementations, multiple resource servers may be used to provide access to a single resource. For example, a single system resource may have multiple capabilities or types of capabilities, each of which may be accessed using a separate resource server. In other implementations, different resource servers may execute on different processors. For example, camera server 140 may operate on a processor dedicated to camera hardware 160, and telephony server 145 may operate on a processor dedicated to telephony hardware 165.

Computing devices 110, 115 may have more, fewer, or different types of associated system resources than those shown in FIG. 1. For example, in addition to or rather than camera hardware 160 and telephony hardware 165, a computing device may include one or more other accessible system resources (e.g., sensors, haptic feedback mechanisms, gyroscopes, etc.). This document generally describes hardware-based system resources for illustrative purposes only, and it should be understood that other types of system resources that are otherwise inaccessible to web applications executing in non-extended web browsers are also within the scope of this disclosure.

Figure 2:
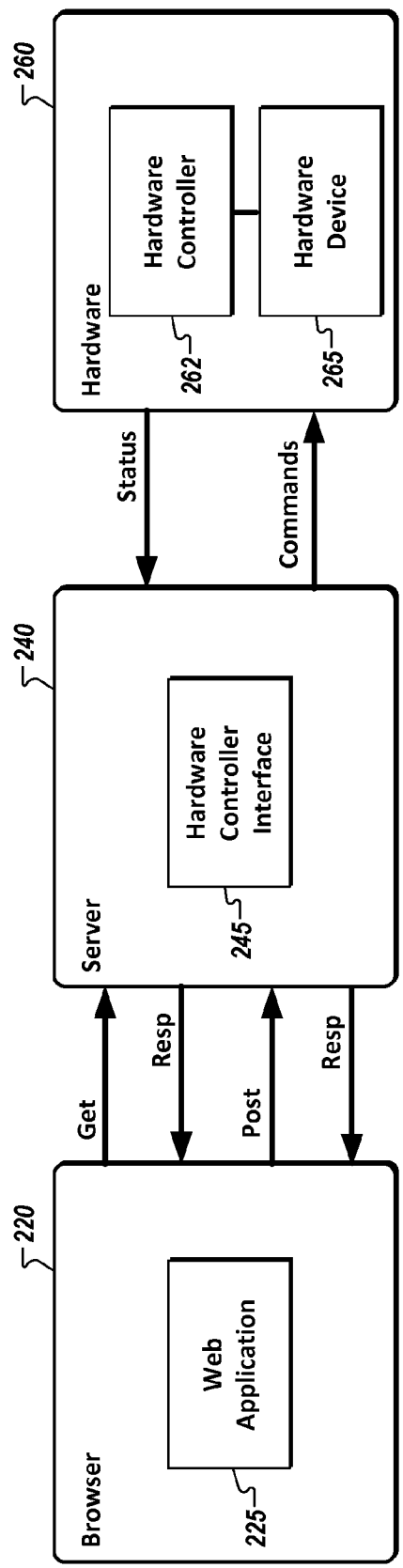
FIG. 2 is a block diagram illustrating example communications between components in the architecture of FIG. 1.

FIG. 2 is a block diagram illustrating example communications between components in the architecture of FIG. 1. In the block diagram, web application 225 executes in browser 220 and is configured to control hardware 260 via server 240. As described above, browser 220 may be a standard, non-extended web browser, or any other appropriate browser that has not been extended to include an interface that controls a system resource, such as hardware 260. Web application 225 is configured to communicate with server 240 using standard HTTP connection patterns. For example, as shown, web application 225 sends HTTP GET and POST messages to server 240, and server 240 responds with HTTP RESPONSE messages.

As described above, web application 225 may be configured to monitor the state of a particular hardware resource using HTTP GET calls to server 240, and to control the hardware resource using HTTP POST calls to server 240. In response to either of these calls, server 240 may respond with an appropriate HTTP RESPONSE message. For example, in response to a monitoring message, server 240 may respond when hardware 260 changes state, and may respond with a message that describes the updated state of hardware 260. As another example, in response to a control message, server 240 may respond that the particular message was received and that the requested control was successfully executed. Server 240 may also respond with an updated state of hardware 260 based on the control that was executed.

Server 240 includes a hardware interface controller 245 that is used to interface with a hardware controller 262 of hardware 260. Hardware interface controller 245 may include instructions describing how to handle incoming HTTP calls from web application 225, and may also include instructions for accessing and controlling the capabilities of a system resource, e.g., hardware device 265, using native resource APIs or other appropriate interfaces. For example, in response to an HTTP GET call that is received from web application 225, hardware controller interface 245 may utilize native APIs of hardware 260 to request the status of hardware device 265. In some implementations, server 240 may respond directly to the HTTP GET request with a current status of hardware 265. In such implementations, web application 225 may utilize continuous polling of server 240 to monitor the status of hardware device 265. In other implementations, server 240 may respond to an HTTP GET request only when the status of hardware device 265 has been updated. In such implementations, web application 225 may utilize a series of long-running GET calls to monitor the status of hardware device 265.

In some implementations, server 240 may communicate with hardware 260 through a set of commands that are implemented in hardware controller interface 245. For example, in response to an HTTP POST command that corresponds to a specific operation of hardware device 265, hardware controller interface 245 may parse the command, process the command, and generate a control message that corresponds to the desired operation. Server 240 may then transmit the message to hardware 260, where hardware controller 262 can similarly receive the command and cause device 265 to perform the operation as requested. Hardware controller 262 may then respond to server 240 with a status of the desired operation—e.g., by indicating whether the operation was successful, or by returning a status code, for example. In some implementations, hardware controller interface 245 may then interpret the status or other response from hardware controller 262 to provide an updated status of hardware device 265 to browser 220.

Hardware 260 includes hardware controller 262 and hardware device 265. Hardware controller 262 operates hardware device 265 according to conventional techniques, such as by providing one or more control signals to hardware device 265. Hardware controller 262 may have one or more associated APIs that provide outside callers with access to the functionality of hardware device 265. These APIs are typically made available to certain native applications operating on the device, but are not made available to a web application operating within a non-extended browser operating on the device. As such, according to the techniques described in this disclosure, server 240 is used as a bridge between browser 220 and hardware 260 to provide a two-way command protocol between web application 225 and hardware device 265.

Figure 3:
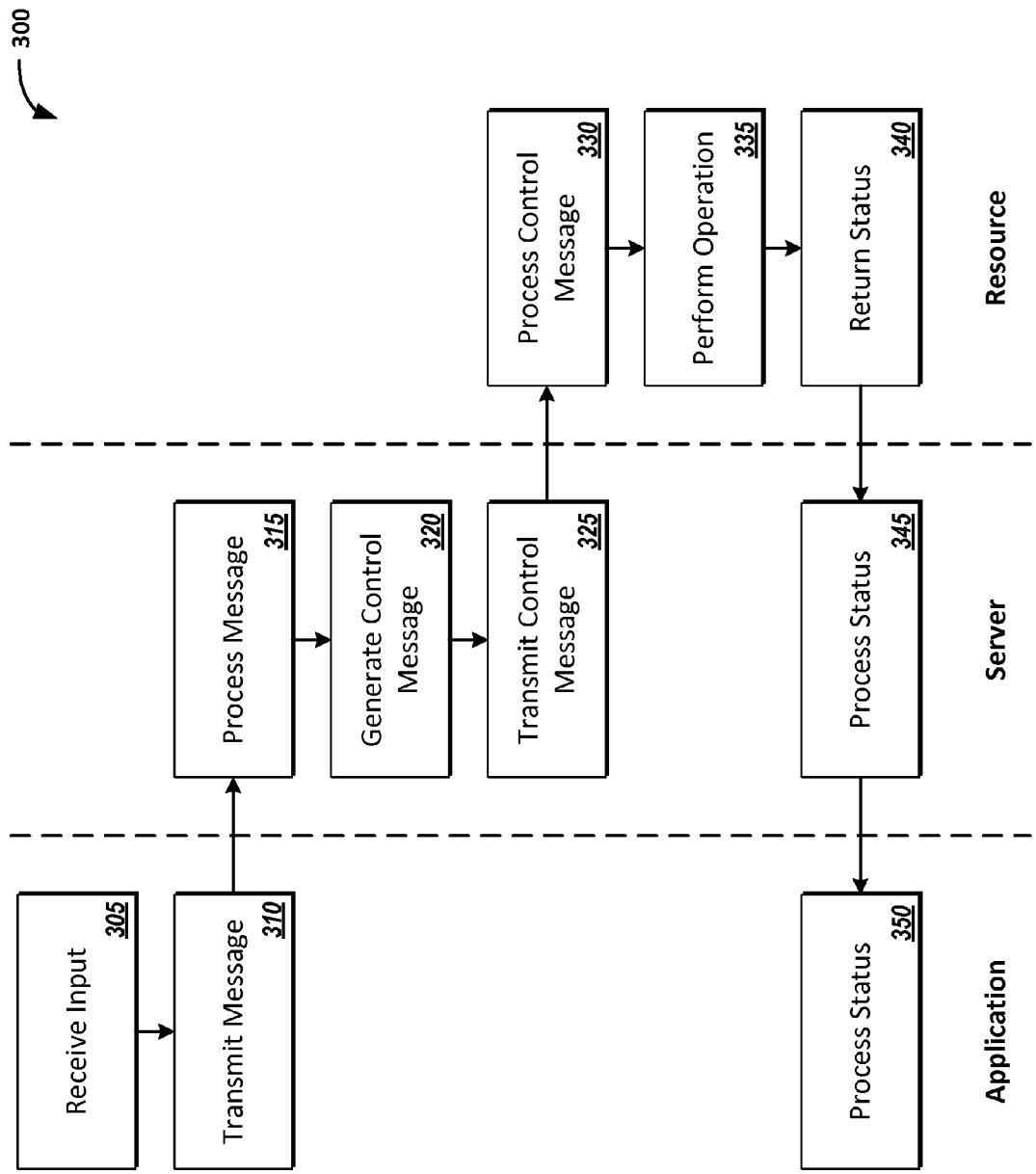
FIG. 3 is a swim-lane diagram illustrating an example process for controlling a system resource using an application operating in a browser.

FIG. 3 is a swim-lane diagram illustrating an example process 300 for controlling a system resource using an application operating in a browser. The process 300 may be performed, for example, by the various components of architecture 100 and, for clarity of presentation only, the description that follows uses architecture 100 as the basis of an example for describing the process. For example, the steps shown in the procedure may be implemented by an application (e.g., web application 130) operating in browser 120, a resource server (e.g., telephony server 145), and a system resource (e.g., telephony hardware 165). However, other components or combinations of components may be used to perform process 300.

Process 300 beings when an application operating in a non-extended browser receives an input (305). The input may be from a source external to the application (such as a user input, or an external call to the application), or may be an automatic input generated by the application itself (such as an application or task timer that indicates when a particular action should be taken by the application). For purposes of an example, it may be assumed that a user has clicked a button on a web page being displayed in the browser of a mobile device that indicates the user's desire to place a call using the telephony hardware of the mobile device.

In response to the input, the application transmits a message to a resource server (310). In this particular example, since the user's input indicates an action to be taken by the resource (e.g., "pick up" the telephone to prepare for the user to place a call), the message may be in the form of an HTTP POST message that includes a command that corresponds to the desired operation (e.g., CALL).

After receiving the transmitted message, the resource server processes the message (315), and generates a control message (320). The control message may be generated based on the command sent in the POST message, which in this example is CALL. The HTTP POST message including the CALL command may be mapped by the resource server to an appropriate native API for the system resource. For example, if the native API does not include a CALL operation, but instead includes corresponding prepareTelephone and dialTelephone procedures, the resource server may generate a control message that utilizes the procedures exposed by the native API and may appropriately fill in any parameters associated with those procedures. The resource server then transmits the control message to the resource (325).

After receiving the transmitted control message, the resource processes the control message (330), and performs the operation that is indicated in the control message (335). For example, a device driver of the telephony resource may prepare the telephony hardware to place a call. The resource may then return a status (340) that indicates, for example, whether the operation was successful, or that the state of the telephony hardware has been updated from an "on Hook" state to a "connecting" state.

After receiving the status from the resource, the resource server processes the status (345). For example, if the resource does not provide updated state information, but rather only provides an indicator that the operation was successful, the resource server may interpret the status to mean that the state of the telephony hardware has been updated from the "on Hook" state to a "connecting" state. In this manner, more complex processing and state maintenance responsibilities may be associated with either the resource server, the resource or both.

After receiving the status from the resource server, the application may also process the status (350). As one example of the application processing the status, the application may provide an updated display to the user to indicate the possible actions that are available to the user based on the current state of the resource. For example, when the telephony hardware is in an "on Hook" state, the user may be shown buttons for picking up the phone to dial, dialing options, etc., whereas when the hardware is in a "connecting" state, the user may be shown buttons for disconnecting or canceling the call.

Figure 4:
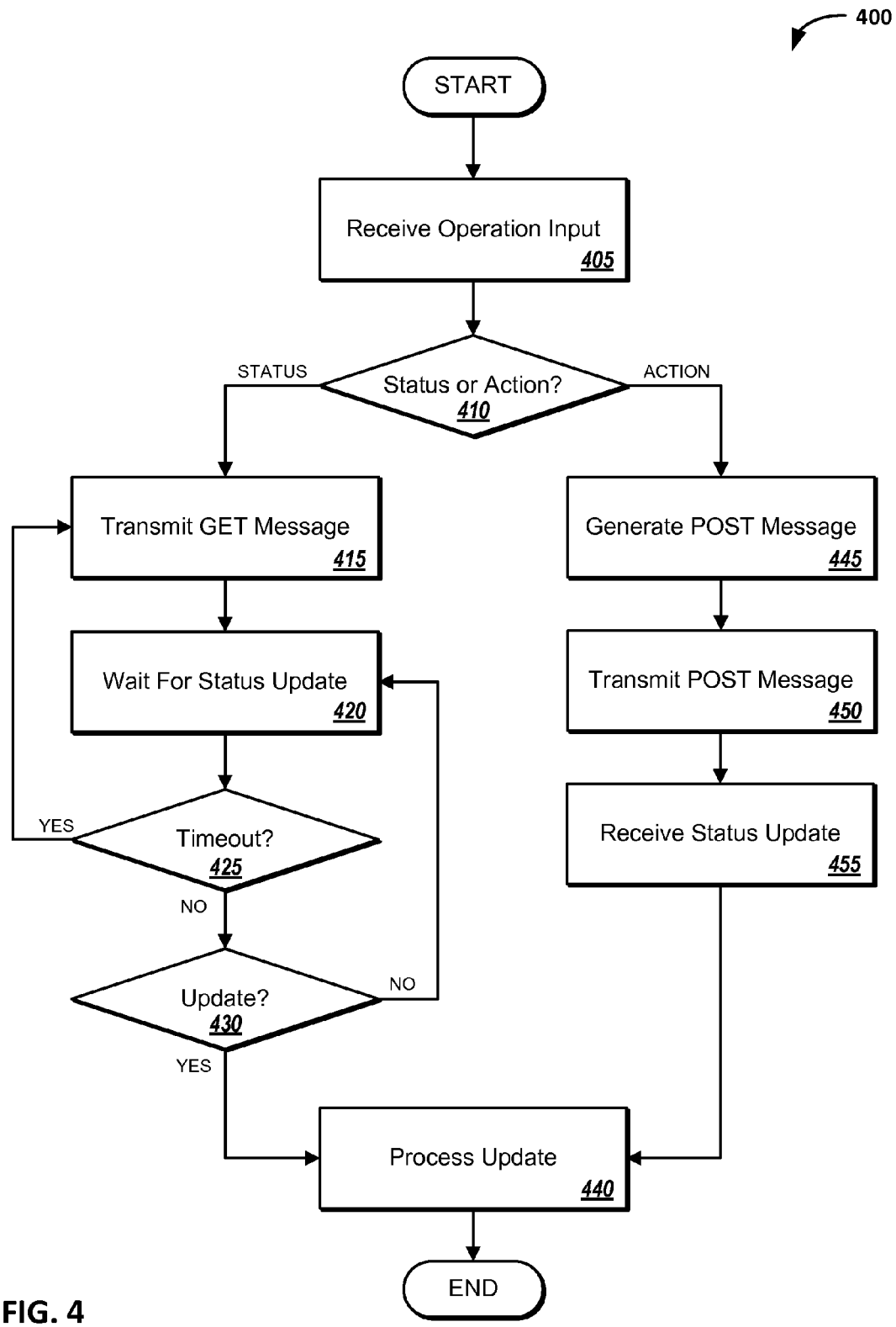
FIG. 4 is a flow diagram illustrating an example process for controlling a system resource using an application operating in a browser.

FIG. 4 is a flow diagram illustrating an example process 400 for controlling a system resource using a web application operating in a browser. Process 400 is similar to process 300, but includes additional details with respect to the processing of the web application. As shown, process 400 includes separate paths that correspond to monitoring a system resource (the STATUS path) and controlling the system resource (the ACTION path). The paths are shown as separate lines of a single process for illustration purposes only. It should be understood that, in certain implementations, the two paths may be processed simultaneously (e.g., by using separate threads or processes) to allow monitoring of the system resource and control of the system resource to occur at the same time.

Process 400 begins when an operation input is received by the web application (405). As described above, the input may correspond to a user input or other external input, or may correspond to an internal input from the application itself. Process 400 then determines whether the operation includes a request for status of the system resource or includes an action to be taken by the resource (410).

If the operation includes a request for status of the system resource, the web application transmits an HTTP GET message (e.g., an XHR GET call) to the resource server (415). The GET call may be held open as a long-running GET call, which remains open until either the GET times out (e.g., after 30 seconds, 1 minute, etc.) or until a state response object is returned from the resource server indicating an update in the status of the resource. As such, after transmitting the GET message, the web application may wait for a status update to be returned from the resource server (420). If it is determined that the GET has timed out (425), a subsequent long-running GET message may be transmitted (415). In some implementations, the cycle of re-transmitting a GET message following a timeout may be repeated indefinitely while the web application is running. In this manner, the web application may continuously monitor for status updates of the system resource.

While waiting for a status update, if it is determined that an update has been received from the resource server (430), the update may be processed by the web application as appropriate (440). The update may include an indicator of the status of the resource. For example, in the case of a telephony system resource, the update from the resource server may indicate that the telephony hardware is in an "on Hook" state. The web application may provide appropriate functionality to the user based on the state information, such as by displaying the various actions that the user can take when the telephony hardware is in an "on Hook" state.

If the operation includes an action to be taken by the resource, the web application generates an HTTP POST message (e.g., an XHR POST call) to be transmitted to the resource server (445), which in turn causes the resource server to cause the resource to perform the requested action. The POST message may include, for example, a command that corresponds to an API of the resource to be controlled. Using the example of a telephony resource, if the user selects a "Call" button on the web application, the web application may generate a message that instructs a telephony resource server to cause the telephony hardware to place a call as specified. In this example, a "Call" command, or a similar procedure may be included as part of a native API that is used to control the telephony hardware.

The POST message is then transmitted to the resource server (450), which processes the message appropriately, and causes the corresponding resource to perform the requested operation. As described above, the original POST message from the web application may be mapped by the resource server to an appropriate API of the device. In response to the POST message, the resource server may provide a status update that is received by the web application (455). As described above, the web application may then process the update appropriately (440).

Figure 5:
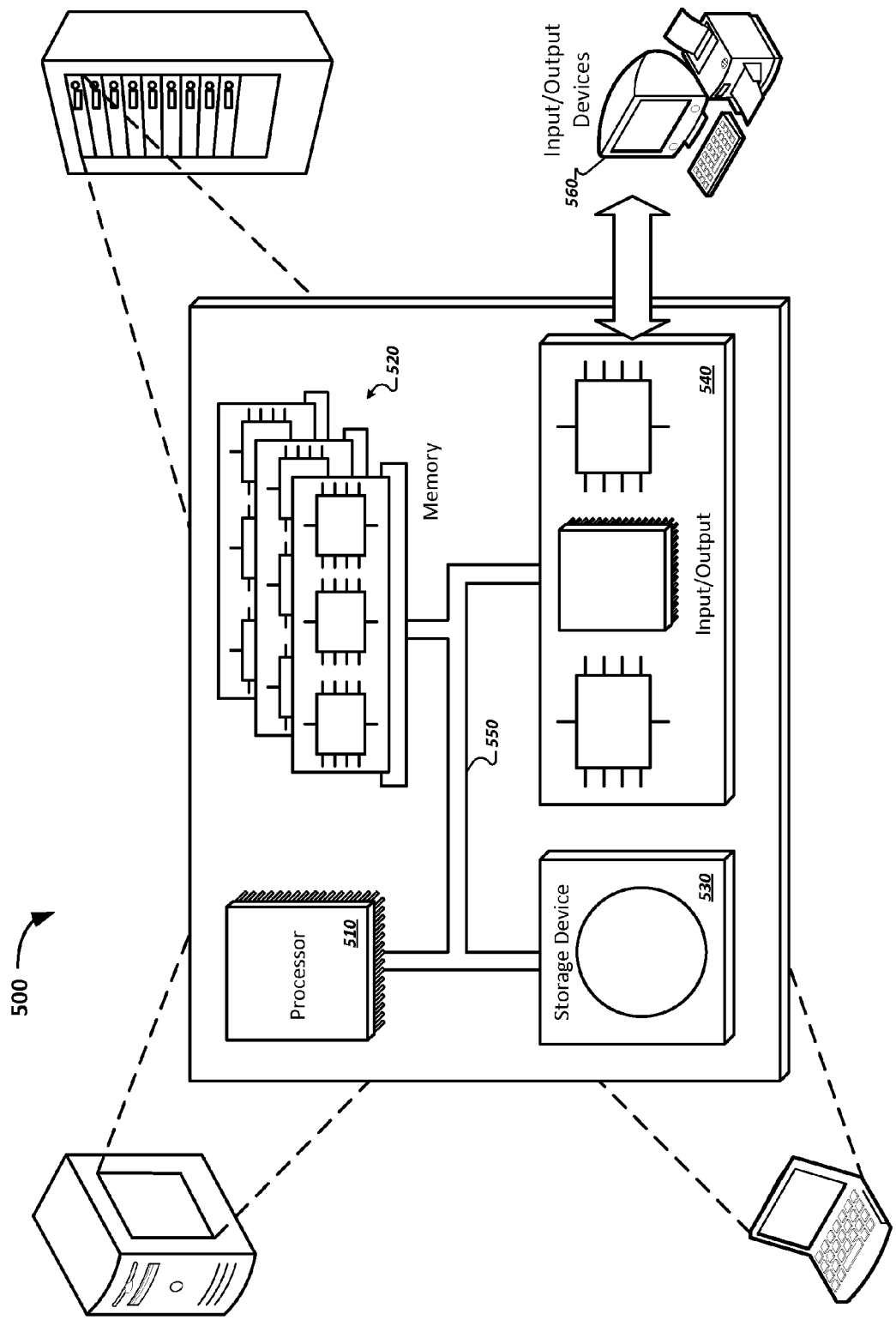
FIG. 5 is a conceptual diagram illustrating example components of a computing system that may be used to implement one or more of the techniques described in this document.

FIG. 5 is a conceptual diagram illustrating example components of a computing system 500 that may be used to implement one or more of the techniques described in this document. As shown, computing system 500 may include various types of computing devices, such as a desktop computer, a laptop computer, a network server, or a mainframe computer. Although not shown, devices incorporated in computing system 500 may also or alternatively include any number of other devices configured to compute and/or communicate via a network, including mobile devices such as mobile phones, personal digital assistants, smart phones, or other mobile devices. Any of these computing devices may be representative of local computing devices 110, 115 depicted in FIG. 1.

System 500 includes a processor 510, a memory 520, a storage device 530, and an input/output component 540. Each of components 510, 520, 530, and 540 may be interconnected via a system bus 550 for inter-component communications. Processor 510 may be configured to process instructions for execution within system 500. Processor 510 may be a single threaded processor, or may be a multi-threaded processor configured to process various instructions in parallel simultaneously. Processor 510 may be capable of processing instructions stored in memory 520 or instructions stored on storage device 530. In one example, processor 510 may be configured to process instructions to cause web application 130 to execute within browser 120 to operate on system 500 consistent with the techniques described herein.

System 500 further includes peripheral devices 560. Peripheral devices 560 may include, for example, a monitor or other display device for presentation of visual information to a user of system 500. Peripheral devices 560 may further include one or more input devices to enable a user to input data to system 500, e.g., a keyboard, mouse, touchpad, trackpad, etc. Peripheral devices 560 may further include printers or other devices to output information. In one example, processor 510 may be configured to process instructions to cause a browser, e.g., browser 120 of FIG. 1, to be displayed to a user via a display of peripheral devices 560. Browser 120 may be configured to execute web application 130 as described herein. Browser 120 may operate on a processor of any of the computing devices described above.

Memory 520 may be configured to store information within system 500 during operation. Memory 520 may be described as a computer-readable storage medium. In some examples, memory 520 is a temporary memory, meaning that a primary purpose of memory 520 is not long-term storage. Memory 520 may also be described as a volatile memory, meaning that memory 520 does not maintain stored contents when the computer is turned off. Examples of volatile memories include random access memories (RAM), dynamic random access memories (DRAM), static random access memories (SRAM), and other forms of volatile memories known in the art.

In some examples, memory 520 may be used to store program instructions for execution by processor 510. In other examples, memory 520 may be used by software or applications running on system 500 to temporarily store information during program execution.

Storage device 530 may also be described as a computer-readable storage medium. In contrast to memory 520, storage device 530 may be configured to store relatively larger amounts of information than memory 520. Storage device 530 may further be configured for long-term storage of information. In some examples, storage device 530 is a non-volatile memory component. In contrast with a volatile memory component, a non-volatile memory may store data whether or not power is supplied to storage device 530. Examples of non-volatile storage devices include magnetic hard discs, optical discs, floppy discs, Flash memories, and other forms of electrically programmable memories (EPROM) or electrically erasable and programmable (EEPROM) memories.

The techniques described here may be implemented according to a computing system 500 as described with respect to FIG. 5 in any combination of digital electronic circuitry, computer hardware, firmware, software, or any combination of digital electronic circuitry, computer hardware, firmware, software. For example, any of the techniques described herein may be implemented via executable program instructions stored in a computer-readable storage medium (e.g., memory 520 and/or storage device 530) that are readable by processor 510 to cause processor 510 to perform the techniques of this disclosure. In other examples, some or all of the techniques of this disclosure may instead or in addition be implemented via dedicated hardware configured for a specific purpose, e.g., a field programmable gate array (FPGA), application specific integrated circuit (ASIC), digital signal processor (DSP), or another like device. The term "processor" or "processing circuitry" may generally refer to any of the foregoing logic circuitry, alone or in combination with other logic circuitry, or any other equivalent circuitry.

Such hardware, software, and firmware may be implemented within the same device or within separate devices to support the various operations and functions described in this disclosure. In addition, any of the described units, modules, or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The described features can be implemented advantageously in one or more computer programs that are executable on a programmable system including at least one programmable processor coupled to receive data and instructions from, and to transmit data and instructions to a computer-readable storage medium. A computer program can be written in any form of programming language, including compiled or interpreted languages, and it can be deployed in any form, including as a stand-alone program or as a module, component, subroutine, or other unit suitable for use in a computing environment.

The described features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as described above. The relationship of client and server arises by virtue of computer programs running on the respective computers and having a client-server relationship to each other.

A number of embodiments have been described. Nevertheless, it will be understood that various modifications may be made without departing from the spirit and scope of the disclosure. For example, much of this document has been described with respect to hardware devices being controlled by a web application, but other types of system resources may also be controlled according to the techniques described herein. As another example, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other embodiments are within the scope of the following claims.

What is claimed is:

1. A computer-readable storage device comprising instructions that, when executed, cause one or more processors of a mobile computing device to:

execute a web application within a web browser of the mobile computing device;

execute a web server having a first interface for receiving HyperText Transfer Protocol (HTTP) messages from the web application of the mobile computing device and a second interface for communicating with telephony hardware of the mobile computing device;

receive, at the web application of the mobile computing device, an input to affect an operation of the telephony hardware, wherein affecting the operation of the telephony hardware includes at least one of 1) placing a telephone call, 2) answering the telephone call, and 3) disconnecting the telephone call, wherein the HTTP message comprises an HTTP GET message, and wherein the instructions to affect the operation of the telephony hardware further comprise instructions causing the one or more processors of the mobile computing device to:

request a status of the telephony hardware; and
receive, at the web server, an indication of the status of the telephony hardware;
transmit, from the web application of the mobile computing device to the web server, the HTTP GET message to affect the operation of the telephony hardware;
hold the HTTP GET message open between the web application and the web server until at least one of 1) the web server responds with an indication of an updated status of the telephony hardware, and 2) the HTTP GET message times out after a configurable amount of time;
process, at the web server, the HTTP message into a hardware control message that includes information about the operation; and
transmit the hardware control message from the web server to the telephony hardware of the mobile computing device to affect the operation by the telephony hardware.

2. The computer-readable storage medium device of claim 1, further comprising instructions that, when executed, cause the one or more processors of the mobile computing device to:
transmit a second HTTP message, wherein the second HTTP message comprises an HTTP POST message, and wherein the HTTP POST message comprises a command that corresponds to an application programming interface of the telephony hardware.

3. The computer-readable storage device of claim 2, wherein processing the HTTP message into a hardware control message comprises mapping the command in the HTTP POST message to the application programming interface of the telephony hardware.

4. The computer-readable storage device of claim 1, wherein the status includes a state of the telephony hardware, and wherein the state of the telephony hardware includes at least one of 1) an on Hook state that enables dialing, and 2) a connecting state that enables canceling the telephone call, the computer-readable storage device further comprising instructions that, when executed, cause the one or more processors to:
update the web browser to indicate at least one of the state of the telephony hardware and a possible action associated with the state of the telephony hardware.

5. The computer-readable storage device of claim 1, wherein the status includes an indication of whether affecting the operation was successful, the computer-readable storage device further comprising instructions that, when executed, cause the one or more processors to:
update the web browser to indicate at least one of whether affecting the operation was successful and a possible action based at least in part on whether affecting the operation was successful.

6. The computer-readable storage device of claim 1, further comprising instructions that, when executed, cause the one or more processors to:
display, at the web browser, one or more buttons associated with the operation of the telephony hardware; and
receive a selection of at least one of the one or more buttons as the input to affect the operation of the telephony hardware.

7. The computer-readable storage device of claim 1, wherein the computer-readable storage device further comprises instructions that, when executed, cause the one or more processors to transmit, from the web application, a second HTTP GET message if the web server does not respond with the indication of the updated status of the telephony hardware within the period of time.

8. The computer-readable storage device of claim 1, wherein placing the telephone call includes at least one of a prepareTelephone procedure that prepares the telephony hardware to participate in the telephone call, and a dialTelephone procedure that enables the telephony hardware to place the telephone call.

9. A method comprising:
executing a web application within a web browser of a mobile computing device;
executing a resource server having a first interface for receiving HyperText Transfer Protocol (HTTP) messages from the web application of the mobile computing device and a second interface for communicating with a telephony resource of the mobile computing device;
receiving, at the web application of the mobile computing device, an input to affect an operation of the telephony resource, wherein affecting the operation of the telephony resource includes at least one of 1) placing a telephone call, 2) answering the telephone call, and 3) disconnecting the telephone call, wherein the HTTP message comprises an HTTP GET message, and wherein affecting the operation of the telephony resource further comprises:
requesting a status of the telephony resource; and
receiving, at the web server, an indication of the status of the telephony resource;
transmitting, from the web application to the resource server, the HTTP GET message to affect the operation of the telephony resource;
holding the HTTP GET message open between the web application and the web server until at least one of 1) the web server responds with an indication of an updated status of the telephony resource, and 2) the HTTP GET message times out after a configurable amount of time;
processing, at the resource server, the HTTP message into a resource control message that includes information about the operation; and
transmitting the resource control message from the resource server to the system telephony resource to affect the operation by the system telephony resource.

10. The method of claim 9, wherein the status includes a state of the telephony hardware, and wherein the state of the telephony hardware includes at least one of 1) an on Hook state that enables dialing, and 2) a connecting state that enables canceling the telephone call, the method further comprising:
updating the web browser to indicate at least one of the state of the telephony hardware and a possible action associated with the state of the telephony hardware.

11. The method of claim 9, wherein the telephony resource comprises telephony hardware of the mobile computing device.

12. The method of claim 9, further comprising:
transmitting, from the web application a second HTTP message, wherein the HTTP message comprises an HTTP POST message, and wherein the HTTP POST message comprises a command that corresponds to an application programming interface of the telephony hardware.

13. The method of claim 12, wherein processing the HTTP message into a resource control message comprises mapping the command in the HTTP POST message to the application programming interface of the telephony resource.

14. The method of claim 9, wherein the status includes an indication of whether affecting the operation was successful, the method further comprising:

updating the web browser to indicate at least one of whether affecting the operation was successful and a possible action based at least in part on whether affecting the operation was successful.

15. The method of claim 9, further comprising:
displaying, at the web browser, one or more buttons associated with the operation of the telephony hardware; and
receiving a selection of at least one of the one or more buttons as the input to affect an operation of the telephony hardware.

16. The method of claim 9, further comprising:
transmitting, from the web application, a second HTTP GET message if the web server does not respond with the indication of the updated status of the telephony resource within the period of time.

17. The method of claim 9, wherein placing the telephone call includes at least one of a prepareTelephone procedure that prepares the telephony hardware to participate in the telephone call, and a dialTelephone procedure that enables the telephony hardware to place the telephone call.

18. A system comprising:
a web application executable in a web browser of a mobile computing device;
a resource server configured to control a telephony resource of the mobile computing device, the resource server having a first interface for receiving HyperText Transfer Protocol (HTTP) messages from the web application and a second interface for communicating with the telephony resource; and
a hardware controller for controlling the telephony resource using the web application via the resource server,
wherein the web application is configured to receive an input to affect an operation of the telephony resource by at least one of 1) placing a telephone call, 2) answering the telephone call, and 3) disconnecting the telephone call,
wherein the web application affects the operation of the telephony resource at least in part by requesting a status of the telephony resource and receiving, at the web server, an indication of the status of the telephony resource, and
wherein the web application holds an HTTP GET message open between the web application and the web server until at least one of 1) the web server responds with an indication of an updated status of the telephony resource, and 2) the HTTP GET message times out after a configurable amount of time.

* * * * *